US012621117B2

(12) United States Patent
Guo et al.

(10) Patent No.: US 12,621,117 B2
(45) Date of Patent: May 5, 2026

(54) TECHNIQUES FOR SIDELINK AND UPLINK FULL DUPLEX COMMUNICATION WITH MULTIPLE TRANSMISSION AND RECEPTION POINTS

(71) Applicant: QUALCOMM Incorporated, San Diego, CA (US)

(72) Inventors: Hui Guo, Beijing (CN); Kapil Gulati, Belle Mead, NJ (US); Navid Abedini, Basking Ridge, NJ (US); Junyi Li, Fairless Hills, PA (US); Sourjya Dutta, San Diego, CA (US); Anantharaman Balasubramanian, San Diego, CA (US); Shuanshuan Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 222 days.

(21) Appl. No.: 18/275,971

(22) PCT Filed: Apr. 5, 2021

(86) PCT No.: PCT/CN2021/085513
§ 371 (c)(1),
(2) Date: Aug. 4, 2023

(87) PCT Pub. No.: WO2022/213236
PCT Pub. Date: Oct. 13, 2022

(65) Prior Publication Data
US 2024/0121069 A1 Apr. 11, 2024

(51) Int. Cl.
*H04L 5/14* (2006.01)
*H04B 7/06* (2006.01)
(Continued)

(52) U.S. Cl.
CPC .......... *H04L 5/14* (2013.01); *H04B 7/06952* (2023.05); *H04B 17/336* (2015.01); *H04W 16/28* (2013.01); *H04W 92/18* (2013.01)

(58) Field of Classification Search
CPC ..... H04L 5/14; H04B 7/06952; H04B 17/336; H04B 7/088; H04W 16/28; H04W 92/18;
(Continued)

(56) References Cited

U.S. PATENT DOCUMENTS 10,554,540 B2 2/2020 Luo et al.
11,375,527 B1* 6/2022 Eyuboglu .......... H04B 7/15528
(Continued)

FOREIGN PATENT DOCUMENTS

CN 108259155 A 7/2018
CN 111343667 A 6/2020
(Continued)

OTHER PUBLICATIONS

International Search Report and Written Opinion—PCT/CN2021/085513—ISA/EPO—Jan. 6, 2022.
(Continued)

*Primary Examiner* — Ivan O Latorre
(74) *Attorney, Agent, or Firm* — ArentFox Schiff LLP

(57) ABSTRACT

Techniques for sidelink (SL) and uplink (UL) full duplex communication with multiple transmission and reception points (multi-TRP) may be performed. In an example, a user equipment (UE) may determine full duplex communication, including simultaneous reception of a SL communication from an SL UE via a first TRP of the UE and transmission of a UL transmission to a base station via a second TRP of the UE, is available. The UE may enable the full duplex communication. The UE may receive, from the SL UE, the SL communication via the first TRP. The UE may transmit,
(Continued)

900

902
Receiving, from a UE, a message indicating to transmit a SL communication to the UE and availability of full duplex communication including simultaneous reception of the SL communication by the UE from the SL UE via a first TRP of the UE and transmission of a UL transmission from the UE to a base station via a second TRP of the UE 904
Determining whether to transmit the SL communication to the UE in response to the receiving the message 906
Transmitting, to the UE, the SL transmission in response to the determining to the base station while simultaneously receiving the SL communication, the UL transmission via the second TRP.

30 Claims, 9 Drawing Sheets

(51) Int. Cl.
*H04B 17/336* (2015.01)
*H04W 16/28* (2009.01)
*H04W 92/18* (2009.01)

(58) Field of Classification Search
CPC ..... H04W 72/20; H04W 76/14; H04W 16/14; H04W 72/541; H04W 76/15
See application file for complete search history.

(56) References Cited

U.S. PATENT DOCUMENTS

| | | | | |
|---|---|---|---|---|
| 11,515,953 | B1 * | 11/2022 | Gutman | H04B 17/24 |
| 11,652,581 | B2 * | 5/2023 | Yeo | H04L 1/1854 |
| | | | | 370/329 |
| 11,949,504 | B2 * | 4/2024 | Zhang | H04L 1/0025 |
| 2016/0066356 | A1 * | 3/2016 | Lindoff | H04W 72/535 |
| | | | | 370/329 |
| 2017/0163404 | A1 * | 6/2017 | Liu | H04W 72/21 |
| 2018/0007724 | A1 * | 1/2018 | Kazmi | H04W 8/005 |
| 2018/0054812 | A1 * | 2/2018 | Luo | H04L 45/16 |
| 2019/0089502 | A1 * | 3/2019 | Yi | H04W 16/14 |
| 2019/0098651 | A1 * | 3/2019 | Wu | H04W 28/0278 |
| 2020/0214018 | A1 * | 7/2020 | Venugopal | H04W 72/046 |
| 2020/0314819 | A1 | 10/2020 | Loehr et al. | |
| 2021/0168814 | A1 * | 6/2021 | Chen | H04W 4/46 |
| 2021/0385056 | A1 * | 12/2021 | Zhou | H04B 7/0695 |
| 2022/0069884 | A1 * | 3/2022 | Zhang | H04B 7/0695 |
| 2022/0141852 | A1 * | 5/2022 | Zhang | H04L 5/14 |
| | | | | 370/329 |
| 2022/0191862 | A1 * | 6/2022 | Hwang | H04W 72/0446 |
| 2022/0394728 | A1 * | 12/2022 | Yang | H04W 72/0453 |
| 2022/0394732 | A1 * | 12/2022 | Hosseini | H04L 5/14 |
| 2023/0050943 | A1 * | 2/2023 | Luo | H04W 72/542 |
| 2023/0083283 | A1 * | 3/2023 | Ibrahim | H04L 5/14 |
| | | | | 370/277 |
| 2023/0118279 | A1 * | 4/2023 | Huang | H04L 5/0094 |
| | | | | 370/329 |
| 2023/0171795 | A1 * | 6/2023 | Di Girolamo | H04W 72/51 |
| | | | | 370/329 |
| 2024/0008055 | A1 * | 1/2024 | Wu | H04L 5/0082 |
| 2024/0015771 | A1 * | 1/2024 | Guo | H04W 72/541 |
| 2024/0080115 | A1 * | 3/2024 | Guo | H04B 7/06954 |
| 2024/0121069 | A1 * | 4/2024 | Guo | H04W 16/14 |
| 2024/0267194 | A1 * | 8/2024 | Elshafie | H04W 72/0473 |
| 2024/0323801 | A1 * | 9/2024 | Zhou | H04W 40/22 |

FOREIGN PATENT DOCUMENTS

| | | |
|---|---|---|
| CN | 112055375 A | 12/2020 |
| WO | 2018038860 | 3/2018 |
| WO | WO-2019142512 A1 | 7/2019 |
| WO | WO-2020198616 A1 | 10/2020 |

OTHER PUBLICATIONS

Lg Electronics: "Issues in Signal Transmissions and Receptions in D2D Operations", 3GPP TSG RAN WG1 Meeting #74, R1-133389 Issues in Signal TX and RX for D2D_LG, 3rd Generation Partnership Project, Mobile Competence Centre, 650, Route Des Lucioles, F-06921 Sophia-Antipolis Cedex, France, vol. RAN WG1, No. Barcelona, Spain, Aug. 19, 20130-Aug. 23, 2013, Aug. 10, 2013, XP050716503, 6 pages, Figures 4, 5, Section 3.3.

LG Electronics: "Physical Layer Enhancements for D2D Communication", 3GPP TSG RAN WG1 Meeting #73, R1-132250, D2D Communication_Lg, 3rd Generation Partnership Project, Mobile Competence Centre, 650, Route Des Lucioles, F-06921 Sophia-Antipolis Cedex, France, vol. RAN WG1, No. Fukuoka, Japan, May 20, 2013-May 24, 2013, May 11, 2013, XP050698022, 10 pages, Section 6, Figures 4 and 6.

Supplementary European Search Report—EP21935476—Search Authority—The Hague—Oct. 29, 2024.

* cited by examiner

800

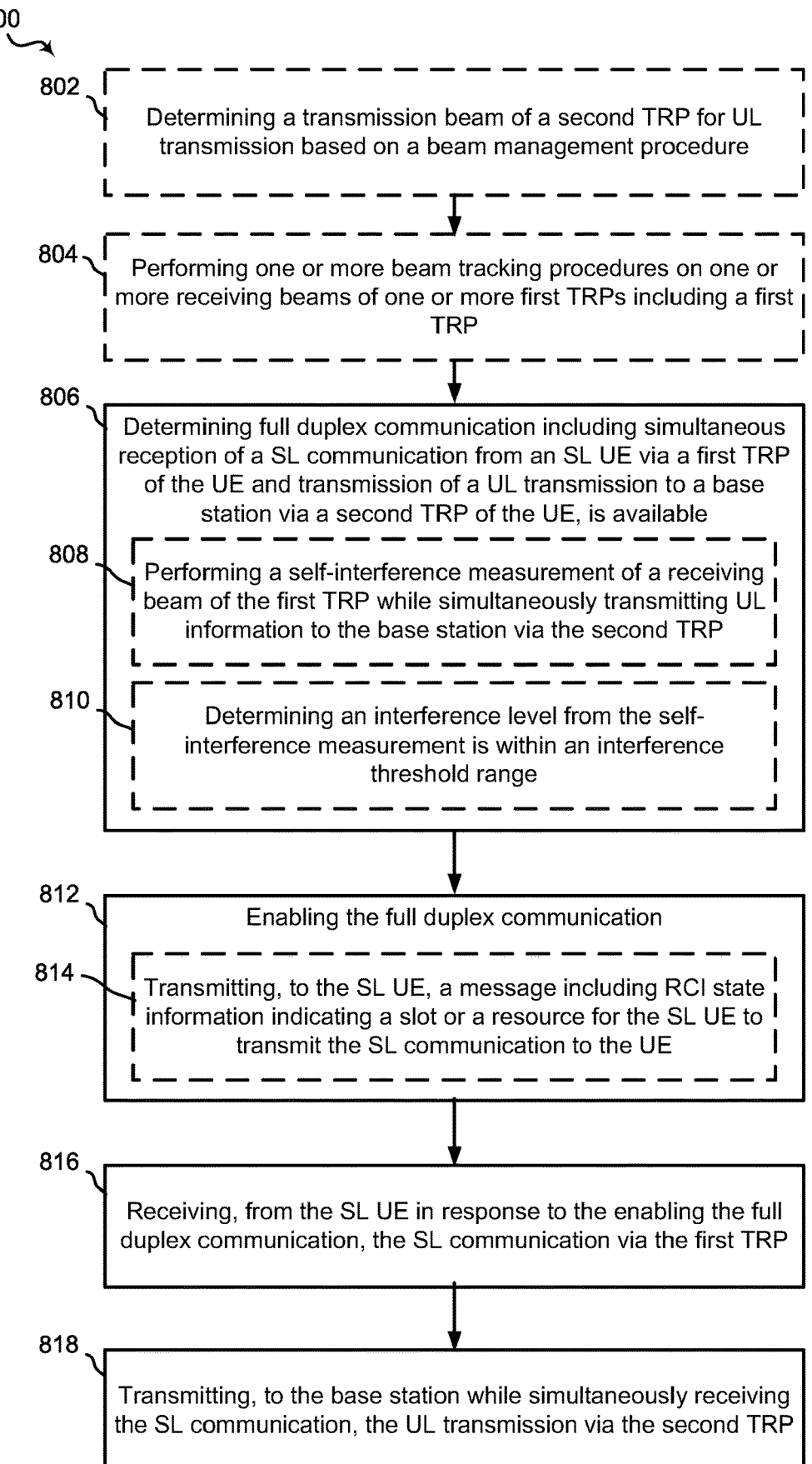

802 Determining a transmission beam of a second TRP for UL transmission based on a beam management procedure 804 Performing one or more beam tracking procedures on one or more receiving beams of one or more first TRPs including a first TRP 806 Determining full duplex communication including simultaneous reception of a SL communication from an SL UE via a first TRP of the UE and transmission of a UL transmission to a base station via a second TRP of the UE, is available 808 Performing a self-interference measurement of a receiving beam of the first TRP while simultaneously transmitting UL information to the base station via the second TRP 810 Determining an interference level from the self-interference measurement is within an interference threshold range 812 Enabling the full duplex communication 814 Transmitting, to the SL UE, a message including RCI state information indicating a slot or a resource for the SL UE to transmit the SL communication to the UE 816 Receiving, from the SL UE in response to the enabling the full duplex communication, the SL communication via the first TRP 818 Transmitting, to the base station while simultaneously receiving the SL communication, the UL transmission via the second TRP

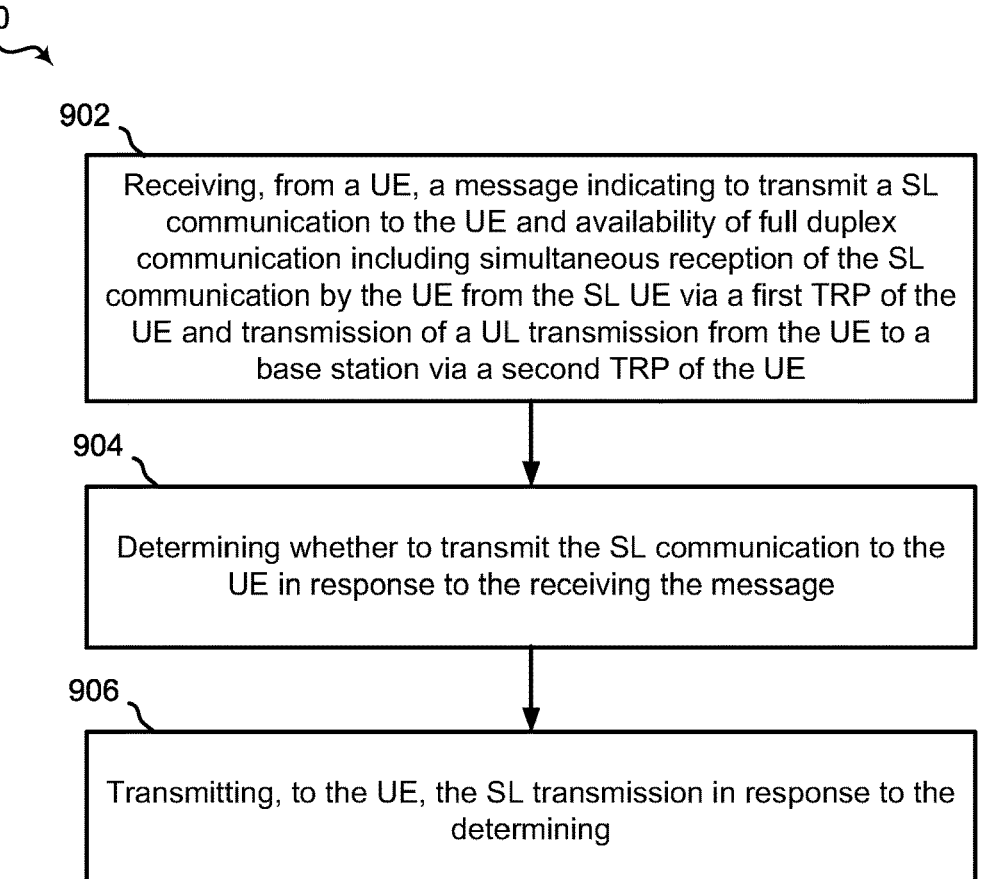

Receiving, from a UE, a message indicating to transmit a SL communication to the UE and availability of full duplex communication including simultaneous reception of the SL communication by the UE from the SL UE via a first TRP of the UE and transmission of a UL transmission from the UE to a base station via a second TRP of the UE

904

Determining whether to transmit the SL communication to the UE in response to the receiving the message

906

Transmitting, to the UE, the SL transmission in response to the determining

*FIG. 9*

TECHNIQUES FOR SIDELINK AND UPLINK FULL DUPLEX COMMUNICATION WITH MULTIPLE TRANSMISSION AND RECEPTION POINTS

CROSS-REFERENCE TO RELATED APPLICATIONS

This application is a 35 U.S.C. § 371 National Phase Application of PCT Application No. PCT/CN2021/085513 filed Apr. 5, 2021, entitled "TECHNIQUES FOR SIDE-LINK AND UPLINK FULL DUPLEX COMMUNICA-TION WITH MULTIPLE TRANSMISSION AND RECEP-TION POINTS," which is assigned to the assignee hereof and hereby incorporated by reference herein.

BACKGROUND

Aspects of the present disclosure relate generally to wireless communications, and more particularly, to tech-niques for sidelink (SL) and uplink (UL) full duplex com-munication with multiple transmission and reception points (multi-TRPs).

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-divi-sion multiple access (TDMA) systems, frequency-division multiple access (FDMA) systems, orthogonal frequency-division multiple access (OFDMA) systems, and single-carrier frequency division multiple access (SC-FDMA) sys-tems.

These multiple access technologies have been adopted in various telecommunication standards to provide a common protocol that enables different wireless devices to commu-nicate on a municipal, national, regional, and even global level. For example, a fifth generation (5G) wireless com-munications technology (which may be referred to as new radio (NR)) is envisaged to expand and support diverse usage scenarios and applications with respect to current mobile network generations. In an aspect, 5G communica-tions technology may include: enhanced mobile broadband addressing human-centric use cases for access to multimedia content, services and data; ultra-reliable-low latency com-munications (URLLC) with certain specifications for latency and reliability; and massive machine type commu-nications, which may allow a very large number of con-nected devices and transmission of a relatively low volume of non-delay-sensitive information. As the demand for mobile broadband access continues to increase, however, further improvements in NR communications technology and beyond may be desired.

SUMMARY

Systems, methods, and apparatus presented herein each have several innovative aspects, no single one of which is solely responsible for the desirable attributes disclosed herein. The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of wireless communication by a user equipment (UE) is provided. The method may include determining full duplex communication including simulta-neous reception of a sidelink (SL) communication from an SL UE via a first transmission and receiving point (TRP) of the UE and transmission of an uplink (UL) transmission to a base station via a second TRP of the UE, is available. The method may also include enabling, in response to the determining the full duplex communication is available, the full duplex communication. The method may also include receiving, from the SL UE in response to the enabling the full duplex communication, the SL communication via the first TRP. The method may also include transmitting, to the base station while simultaneously receiving the SL commu-nication, the UL transmission via the second TRP.

In another aspect, a method of wireless communication by an SL UE is provided. The method may include receiving, from a UE, a message indicating to transmit a SL commu-nication to the UE and availability of full duplex commu-nication including simultaneous reception of the SL com-munication by the UE from the SL UE via a first TRP of the UE and transmission of a UL transmission from the UE to a base station via a second TRP of the UE. The method may also include determining whether to transmit the SL com-munication to the UE in response to the receiving the message. The method may also include transmitting, to the UE, the SL communication in response to the determining.

In another aspect, a UE is provided. The UE may include a memory storing instructions, and one or more processors communicatively coupled with the memory. The one or more processors may be configured to determine full duplex communication including simultaneous reception of an SL communication from an SL UE via a first TRP of the UE and transmission of a UL transmission to a base station via a second TRP of the UE, is available. The one or more processors may also be configured to enable, in response to determining the full duplex communication is available, the full duplex communication. The one or more processors may also be configured to receive, from the SL UE in response to enabling the full duplex communication, the SL communi-cation via the first TRP. The one or more processors may also be configured to transmit, to the base station while simultaneously receiving the SL communication, the UL transmission via the second TRP.

In another example, an SL UE is provided. The SL UE may include a memory storing instructions, and one or more processors communicatively coupled with the memory. The one or more processors may be configured to receive, from a UE, a message indicating to transmit a SL communication to the UE and availability of full duplex communication including simultaneous reception of the SL communication by the UE from the SL UE via a first TRP of the UE and transmission of a UL transmission from the UE to a base station via a second TRP of the UE. The one or more processors may also be configured to determine whether to transmit the SL communication to the UE in response to receiving the message. The one or more processors may also be configured to transmit, to the UE, the SL communication in response to determining whether to transmit the SL communication.

In other aspects, apparatuses and computer-readable mediums for performing these methods are provided.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 8 is flowchart of an example method performed by a UE of FIG. 1, according to aspects of the present disclosure; and FIG. 9 is flowchart of another example method performed by a SL UE of FIG. 1, according to aspects of the present disclosure.

DETAILED DESCRIPTION

Figure 1:
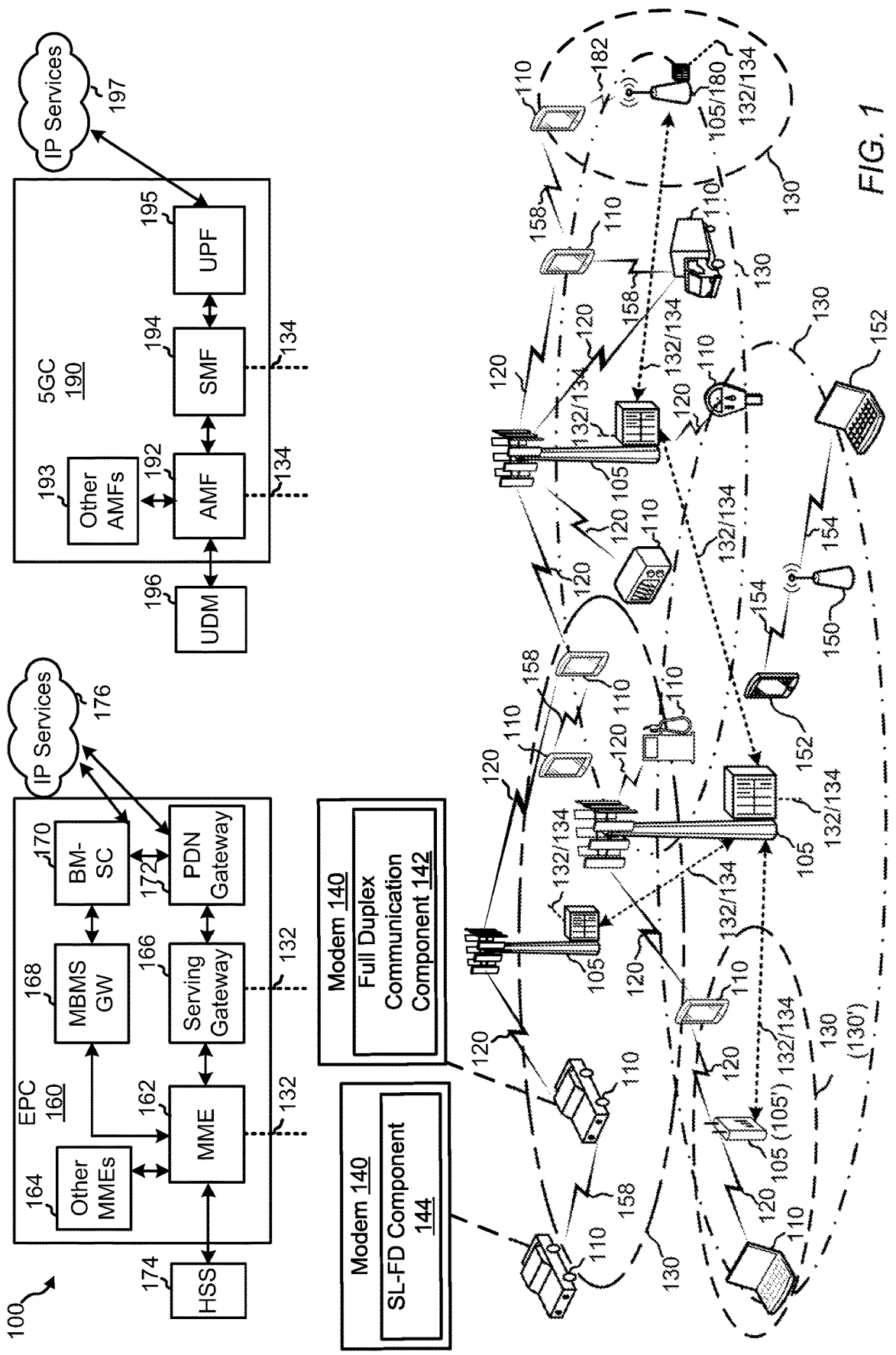
FIG. 1 is a diagram illustrating an example of a wireless communications system and an access network, according to aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

For vehicle-to-everything (V2X) communications, multiple transmission and reception points (multi-TRPs) may be used in fifth generation (5G) new radio (NR) technologies to improve reliability, coverage, and capacity performance through flexible deployment scenarios. In particular, multi-TRPs equipped in different parts of a vehicle may be used to improve reliability in safety and other high robustness desired applications. Conventionally, a vehicle having multi-TRPs may communicate using full duplex (e.g., simultaneous uplink (UL) and downlink (DL) communication) with a single node (e.g., base station 105).

The present disclosure provides techniques for SL and UL full duplex communications for user equipments (UEs) (e.g., vehicles) with multi-TRPs. In an example, a UE may determine an availability of a full duplex communication, including simultaneous reception of a SL communication from an SL UE via a first TRP of the UE and transmission of a UL transmission to a base station via a second TRP of the UE, based on, for example, signal measurements on a SL communication. In response to the measurements, the UE may receive, from the SL UE, the SL communication via the first TRP. The UE may transmit, to the base station while simultaneously receiving the SL communication, the UL transmission via the second TRP.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

Turning now to the figures, examples of systems, apparatus, and methods according to aspects of the present disclosure are depicted. It is to be understood that aspects of the figures may not be drawn to scale and are instead drawn for illustrative purposes.

FIG. 1 is a diagram illustrating an example of a wireless communications system and an access network 100. The wireless communications system (also referred to as a wireless wide area network (WWAN)) includes at least one base station 105, UEs 110, an Evolved Packet Core (EPC) 160, and a 5G Core (5GC) 190. The base station 105 may include macro cells (high power cellular base station) and/or small cells (low power cellular base station). The macro cells include base stations. The small cells include femto-cells, picocells, and microcells.

In some implementations, the UEs 110 may include a modem 140 and/or a full duplex communication component 142 for enabling SL and UL full duplex communications with multi-TRP. In some implementations, the UEs 110 communicating with SL communications with other UEs 110 may (additionally or alternatively) include the modem 140 and/or a SL-full duplex (SL-FD) component 144 for transmitting SL communications to another UE 110 with multi-TRP to use in a SL and UL full duplex communications.

A base station 105 may be configured for 4G LTE (collectively referred to as Evolved Universal Mobile Telecommunications System (UMTS) Terrestrial Radio Access Network (E-UTRAN)) may interface with the EPC 160 through backhaul links interfaces 132 (e.g., S1, X2, Internet Protocol (IP), or flex interfaces). A base station 105 configured for 5G NR (collectively referred to as Next Generation RAN (NG-RAN)) may interface with 5GC 190 through backhaul links interfaces 134 (e.g., S1, X2, Internet Protocol (IP), or flex interface). In addition to other functions, the base station 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base station 105 may communicate directly or indirectly (e.g., through the EPC 160 or 5GC 190) with each other over the backhaul links interfaces 134. The backhaul links 132, 134 may be wired or wireless.

The base station 105 may wirelessly communicate with the UEs 110. Each of the base station 105 may provide communication coverage for a respective geographic coverage area 130. There may be overlapping geographic coverage areas 130. For example, the small cell 105' may have a coverage area 130' that overlaps the coverage area 130 of one or more macro base station 105. A network that includes both small cell and macro cells may be known as a heterogeneous network. A heterogeneous network may also include Home Evolved Node base station (eNBs) (HeNBs), which may provide service to a restricted group known as a closed subscriber group (CSG). The communication links 120 between the base station 105 and the UEs 110 may include uplink (UL) (also referred to as reverse link) transmissions from a UE 110 to a base station 105 and/or downlink (DL) (also referred to as forward link) transmissions from a base station 105 to a UE 110. The communication links 120 may use multiple-input and multiple-output (MIMO) antenna technology, including spatial multiplexing, beamforming, and/or transmit diversity. The communication links may be through one or more carriers. The base station 105/UEs 110 may use spectrum up to Y MHz (e.g., 5, 10, 15, 20, 100, 600, etc. MHz) bandwidth per carrier allocated in a carrier aggregation of up to a total of $Y_x$ MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 158. The D2D communication link 158 may use the DL/UL WWAN spectrum. The D2D communication link 158 may use one or more SL channels, such as a physical SL broadcast channel (PSBCH), a physical SL discovery channel (PSDCH), a physical SL shared channel (PSSCH), and a physical SL control channel (PSCCH). D2D communication may be through a variety of wireless D2D communications systems, such as for example, FlashLinQ, WiMedia, Bluetooth, Zig-Bee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 105' may operate in a licensed and/or an unlicensed frequency spectrum. When operating in an unlicensed frequency spectrum, the small cell 105' may employ NR and use the same 5 GHz unlicensed frequency spectrum as used by the Wi-Fi AP 150. The small cell 105', employing NR in an unlicensed frequency spectrum, may boost coverage to and/or increase capacity of the access network.

A base station 105, whether a small cell 105' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 110. When the gNB 180 operates in mmW or near mmW frequencies, the gNB 180 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 110 to compensate for the path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 110 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base station 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station 105 may also be referred to as a gNB, Node B, evolved Node B (eNB), an access point, a base transceiver station, a radio base station, an access point, an access node, a radio transceiver, a NodeB, eNodeB (eNB), gNB, Home NodeB, a Home eNodeB, a relay, a transceiver function, a basic service set (BSS), an extended service set (ESS), a transmit reception point (TRP), or some other suitable terminology. The base station 105 provides an access point to the EPC 160 or 5GC 190 for a UE 110. Examples of UEs 110 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 110 may be referred to as IoT devices (e.g., parking meter, gas pump, toaster, vehicles, heart monitor, etc.). The UE 110 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
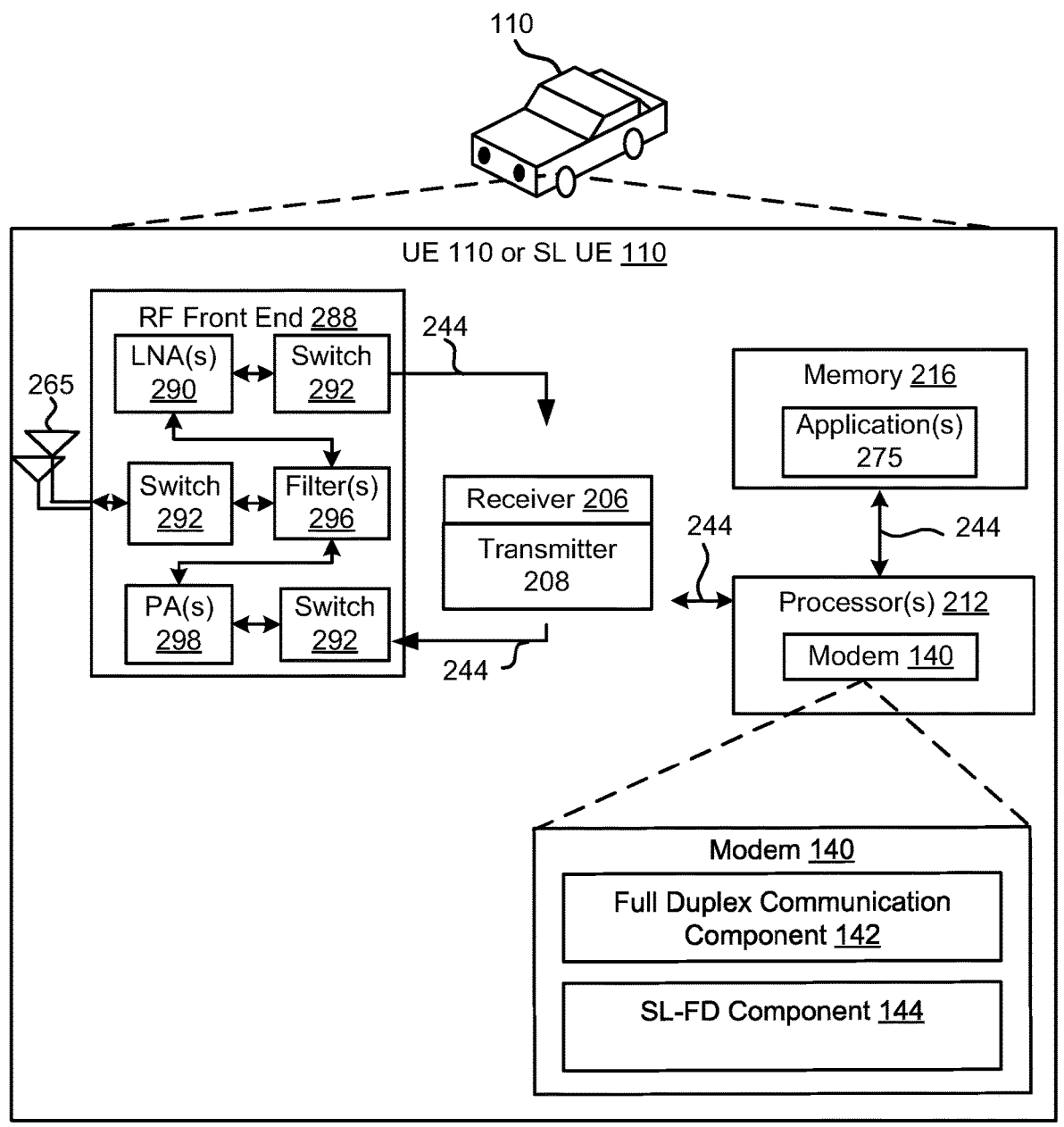
FIG. 2 is a schematic diagram of an example of a user equipment (UE) of FIG. 1, according to aspects of the present disclosure.

Referring to FIG. 2, an example implementation of the UE 110 may include the modem 140 having the full duplex communication component 142 and/or the SL-FD component 144. The modem 140 and/or the full duplex communication component 142 of the UE 110 may be configured to implement SL and UL full duplex communication with multi-TRPs, as described in further detail herein. Additionally (or alternatively), the modem 140 and/or the SL-FD component 144 of the UE 110 may be configured to implement SL communication with a multi-TRP of another UE configured for SL and UL full duplex communication via multi-TRPs, as described in further detail herein.

In some implementations, the UE 110 may include a variety of components, including components such as one or more processors 212 and memory 216 and transceiver 202 in communication via one or more buses 244, which may operate in conjunction with the modem 140, the full duplex communication component 142, and/or the SL-FD communication component 144 to enable one or more of the functions related to SL and UL full duplex communication with multi-TRPs. Further, the one or more processors 212, modem 140, memory 216, transceiver 202, RF front end 288 and one or more antennas 265, may be configured to support voice and/or data calls (simultaneously or non-simultaneously) in one or more radio access technologies. The one or more antennas 265 may include one or more antennas, antenna elements and/or antenna arrays.

In an aspect, the one or more processors 212 may include the modem 140 that uses one or more modem processors. The various functions related to the full duplex communication component 142 and/or SL-FD communication component 144 may be included in the modem 140 and/or the processors 212 and, in an aspect, may be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiving device processor, or a transceiver processor associated with transceiver 202. Additionally, the modem 140 may configure the UE 110 along with the processors 212. In other aspects, some of the features of the one or more processors 212 and/or the modem 140 associated with the full duplex communication component 142 and/or the SL-FD communication component 144 may be performed by the transceiver 202.

Also, the memory 216 may be configured to store data used herein and/or local versions of applications 275 or the full duplex communication component 142 and/or one or more subcomponents of the full duplex communication component 142 and/or the SL-FD communication component 144 and/or one or more subcomponents of the SL-FD communication component 144 being executed by at least one processor 212. The memory 216 may include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, the memory 216 may be a non-transitory computer-readable storage medium that stores one or more computer-executable codes defining the full duplex communication component 142, SL-FD communication component 144, and/or one or more of their subcomponents, and/or data associated therewith, when the UE 110 is operating at least one processor 212 to execute the full duplex communication component 142, the SL-FD communication component 144, and/or one or more of the subcomponents.

The transceiver 202 may include at least one receiver 206 and at least one transmitter 208. The receiver 206 may include hardware, firmware, and/or software code executable by a processor for receiving data, the code comprising instructions and being stored in a memory (e.g., computer-readable medium). The receiver 206 may be, for example, an RF receiving device. In an aspect, the receiver 206 may receive signals transmitted by at least one base station 105. The transmitter 208 may include hardware, firmware, and/or software code executable by a processor for transmitting data, the code comprising instructions and being stored in a memory (e.g., computer-readable medium). A suitable example of the transmitter 208 may include, but is not limited to, an RF transmitter.

Moreover, in an aspect, the UE 110 may include the RF front end 288, which may operate in communication with one or more antennas 265 and the transceiver 202 for receiving and transmitting radio transmissions, for example, wireless communications transmitted by at least one base station 105 or wireless transmissions transmitted by the UE 110. The RF front end 288 may be coupled with one or more antennas 265 and may include one or more low-noise amplifiers (LNAs) 290, one or more switches 292, one or more power amplifiers (PAs) 298, and one or more filters 296 for transmitting and receiving RF signals.

In an aspect, the LNA 290 may amplify a received signal at a desired output level. In an aspect, each of the LNAs 290 may have a specified minimum and maximum gain values. In an aspect, the RF front end 288 may use one or more switches 292 to select a particular LNA 290 and the specified gain value based on a desired gain value for a particular application.

Further, for example, one or more PA(s) 298 may be used by the RF front end 288 to amplify a signal for an RF output at a desired output power level. In an aspect, each of the PAs 298 may have specified minimum and maximum gain values. In an aspect, the RF front end 288 may use one or more switches 292 to select a particular PA 298 and the specified gain value based on a desired gain value for a particular application.

Also, for example, one or more filters 296 may be used by the RF front end 288 to filter a received signal to obtain an input RF signal. Similarly, in an aspect, for example, a respective filter 296 may be used to filter an output from a respective PA 298 to produce an output signal for transmission. In an aspect, each filter 296 may be coupled with a specific LNA 290 and/or PA 298. In an aspect, the RF front end 288 may use one or more switches 292 to select a transmit or receive path using a specified filter 296, the LNA 290, and/or the PA 298, based on a configuration as specified by the transceiver 202 and/or processor 212.

As such, the transceiver 202 may be configured to transmit and receive wireless signals through one or more antennas 265 via the RF front end 288. In an aspect, the transceiver 202 may be tuned to operate at specified frequencies such that the UE 110 may communicate with, for example, one or more of the base stations 105 or one or more cells associated with one or more of the base stations 105. In an aspect, for example, the modem 140 may configure the transceiver 202 to operate at a specified frequency and power level based on a UE configuration of the UE 110 and the communication protocol used by the modem 140.

In an aspect, the modem 140 may be a multiband-multimode modem, which may process digital data and communicate with the transceiver 202 such that the digital data is sent and received using the transceiver 202. In an aspect, the modem 140 may be multiband and be configured to support multiple frequency bands for a specific communications protocol. In an aspect, the modem 140 may be multimode and be configured to support multiple operating networks and communications protocols. In an aspect, the modem 140 may control one or more components of the UE 110 (e.g., RF front end 288, transceiver 202) to enable transmission and/or reception of signals from the network based on a specified modem configuration. In an aspect, a modem configuration may be based on the mode of the modem 140 and the frequency band in use. In another aspect, the modem configuration may be based on UE configuration information associated with the UE 110 as provided by the network (e.g., base station 105).

Figure 3:
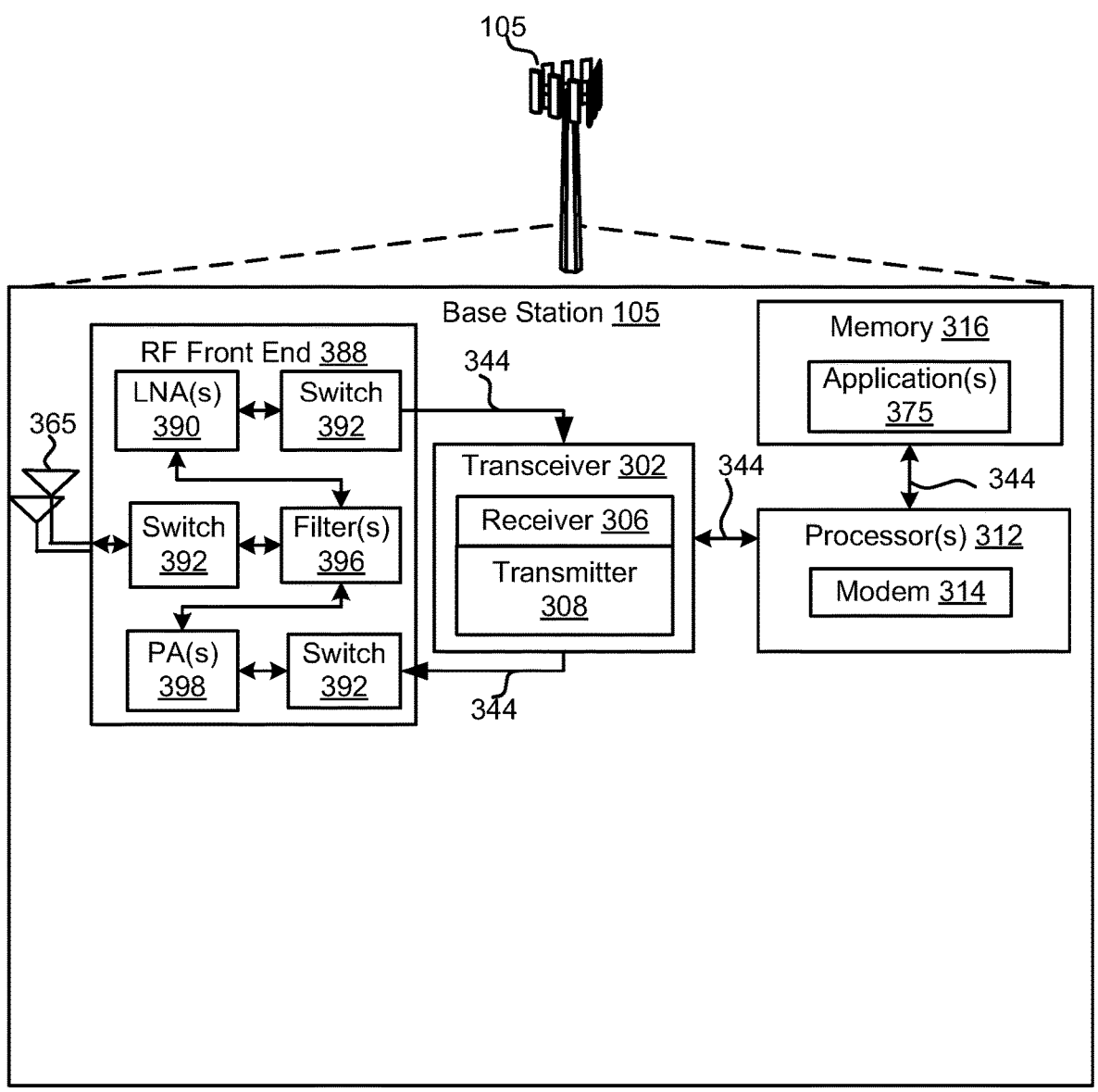
FIG. 3 is a schematic diagram of an example of a base station of FIG. 1, according to aspects of the present disclosure.

Referring to FIG. 3, an example implementation of the base station 105 may include a modem 314 configured to communicate with UEs 110. In some implementations, the base station 105 may include a variety of components, including components such as one or more processors 312 and memory 316 and transceiver 302 in communication via one or more buses 344, which may operate in conjunction with the modem 314 to enable one or more of the functions related to UE communication described herein. Further, the one or more processors 312, the modem 314, the memory 316, the transceiver 302, a RF front end 388, and one or more antennas 365, may be configured to support voice and/or data calls (simultaneously or non-simultaneously) in one or more radio access technologies. The one or more antennas 365 may include one or more antennas, antenna elements and/or antenna arrays.

In an aspect, the one or more processors 312 may include the modem 314 that uses one or more modem processors. The various functions of the modem 314 and/or the processors 312 may be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiving device processor, or a transceiver processor associated with the transceiver 302. Additionally, the modem 314 may configure the base station 105 and the processors 312. In other aspects, some of the features of the one or more processors 312 and/or the modem 314 may be performed by the transceiver 302.

Also, the memory 316 may be configured to store data used herein and/or local versions of applications 375, and/or one or more subcomponents of the modem 314 being executed by at least one processor 312. The memory 316 may include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, the memory 316 may be a non-transitory computer-readable storage medium that stores one or more computer-executable codes defining the modem 314 and/or one or more of the subcomponents, and/or data associated therewith, when the base station 105 is operating at least one processor 312 to execute the modem 314 and/or one or more of the subcomponents.

The transceiver 302 may include at least one receiver 306 and at least one transmitter 308. The at least one receiver 306 may include hardware, firmware, and/or software code executable by a processor for receiving data, the code comprising instructions and being stored in a memory (e.g., computer-readable medium). The receiver 306 may be, for example, an RF receiving device. In an aspect, the receiver 306 may receive signals transmitted by the UE 110. The transmitter 308 may include hardware, firmware, and/or software code executable by a processor for transmitting data, the code comprising instructions and being stored in a memory (e.g., computer-readable medium). A suitable example of the transmitter 308 may include, but is not limited to, an RF transmitter.

Moreover, in an aspect, the base station 105 may include the RF front end 388, which may operate in communication with one or more antennas 365 and the transceiver 302 for receiving and transmitting radio transmissions, for example, wireless communications transmitted by other base stations 105 or wireless transmissions transmitted by the UE 110. The RF front end 388 may be coupled with one or more antennas 365 and may include one or more low-noise amplifiers (LNAs) 390, one or more switches 392, one or more power amplifiers (PAs) 398, and one or more filters 396 for transmitting and receiving RF signals.

In an aspect, the LNA 390 may amplify a received signal at a desired output level. In an aspect, each of the LNAs 390 may have a specified minimum and maximum gain values. In an aspect, the RF front end 388 may use one or more switches 392 to select a particular LNA 390 and the specified gain value based on a desired gain value for a particular application.

Further, for example, one or more PA(s) 398 may be used by the RF front end 388 to amplify a signal for an RF output at a desired output power level. In an aspect, each PA 398 may have specified minimum and maximum gain values. In an aspect, the RF front end 388 may use one or more switches 392 to select a particular PA 398 and the specified gain value based on a desired gain value for a particular application.

Also, for example, one or more filters 396 may be used by the RF front end 388 to filter a received signal to obtain an input RF signal. Similarly, in an aspect, for example, a respective filter 396 may be used to filter an output from a respective PA 398 to produce an output signal for transmission. In an aspect, each filter 396 may be coupled with a specific LNA 390 and/or PA 398. In an aspect, the RF front end 388 may use one or more switches 392 to select a transmit or receive path using a specified filter 396, the LNA 390, and/or the PA 398, based on a configuration as specified by the transceiver 302 and/or the processor 312.

As such, the transceiver 302 may be configured to transmit and receive wireless signals through one or more antennas 365 via the RF front end 388. In an aspect, transceiver may be tuned to operate at specified frequencies such that the base station 105 may communicate with, for example, the UE 110 or one or more cells associated with one or more base station 105. In an aspect, for example, the modem 314 may configure the transceiver 302 to operate at a specified frequency and power level based on the base station configuration of the base station 105 and the communication protocol used by the modem 314.

In an aspect, the modem 314 may be a multiband-multimode modem, which may process digital data and communicate with the transceiver 302 such that the digital data is sent and received using the transceiver 302. In an aspect, the modem 314 may be multiband and be configured to support multiple frequency bands for a specific communications protocol. In an aspect, the modem 314 may be multimode and be configured to support multiple operating networks and communications protocols. In an aspect, the modem 314 may control one or more components of the base station 105 (e.g., RF front end 388, transceiver 302) to enable transmission and/or reception of signals from the network based on a specified modem configuration. In an aspect, the modem configuration may be based on the mode of the modem 314 and the frequency band in use. In another aspect, the modem configuration may be based on a base station configuration associated with the base station 105.

As described herein, multi-TRPs equipped in different parts of a vehicle may be used to improve reliability in safety and other high robustness desired applications. From a transmission point of view, data coverage may be biased. For example, side coverage may not be that important in certain cases, and front or back biased or 360-degree coverage may be dependent on packet content/type. From a receiver point of view, multi-TRPs at a vehicle may use 360-degree coverage. For example, the vehicle may better use both TRPs to receive packets from other vehicles (or user equipments (UEs)).

In an aspect, full duplex may be used by a vehicle. Wireless full duplex communication is a technique which may double a link capacity, theoretically, by enabling radio network nodes to transmit and receive simultaneously on the same frequency and time radio resource. Full duplex may break half duplex operation constrains where transmission and reception either differ in time or in frequency. A full duplex network node, such as a base station or a UE in the cellular network, may communicate simultaneously in UL communications and DL communications with two half duplex panels using the same radio resources.

In V2X communications, a vehicle equipped with multi-TRPs and capable of simultaneous transmission and reception using the same time-frequency radio resource, is referred to as a full duplex capable UE, and may work in both full duplex mode and back-off half duplex mode. In some situations, however, suppressing various interferences for full duplex communications may be difficult to suppress. For example, a UE may see higher self-interference (e.g., reduced signal-interference-noise ratio (SINR)) from a transmission panel to receiving panel, or may see cluster interference from surrounding objects. Thus, a full duplex capable UE may not always work in full duplex mode, due to high interference.

Figure 4:
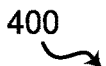
FIG. 4 includes call flow diagrams of examples of sidelink (SL) resource allocations, according to aspects of the present disclosure.
Figure 4:
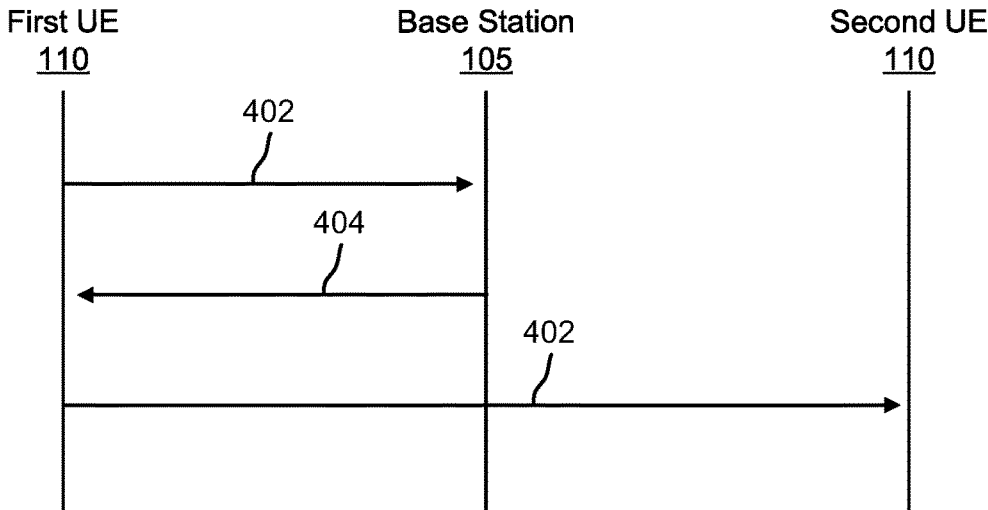
Figure 4:
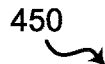
Figure 4:
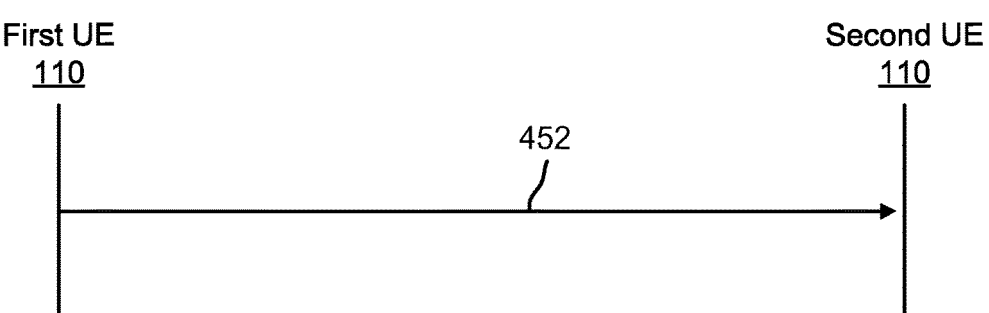

Referring to FIG. 4, two resource allocation modes may be used for SL communication between two UEs, first UE 110 and second UE 110. In a first resource allocation mode 400, a base station 105 may allocate resources for SL communications between the first UE 110 and the second UE 110. For example, the first UE 110 may transmit an SL buffer status report (BSR) 402 to the base station 105 requesting to communicate with the second UE 110 via SL communication. The base station 105 may schedule SL resources when the SL BSR 402 is received and allow SL communications by transmitting (e.g., via a DL control indicator (DCI)) a SL grant 404, containing information on resources for the first UE 110 to connect with the second UE 110, to the first UE 110. As a result, the first UE 110 may sent a SL transmission 406 to the second UE 110. In this allocation mode, the base station 105 may be ignorant of the second UEs information of the SL transmission 406.

In a second resource allocation mode 450, the first UE 110 and the second UE 110 may autonomously select and reserve SL time-frequency resources. Thereby, the first UE 110 may transmit a SL transmission 452 without the use of a base station 105. The second resource allocation mode is focused on for purposes of the present disclosure.

Figure 5:
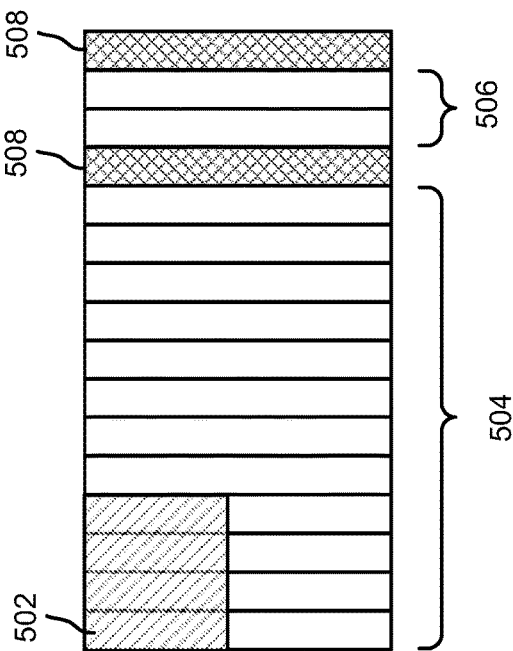
FIG. 5 is a conceptual diagram of an example physical channel structure, according to aspects of the present disclosure.

Referring to FIG. 5, a physical channel structure 500 may include a physical SL control channel (PSCCH) 502, a physical SL share channel (PSSCH) 504, a physical SL feedback channel (PSFCH) 506, and gaps 508.

In an example, for resource reservation and physical layer processing, both periodic and aperiodic transmissions may be supported by NR V2X technologies. For example, a transmission may reserve resources in a current slot and in up to one or more (e.g., 2) future slots. For example, a first stage control (SCI-1) signal may be transmitted on the PSCCH 506 and may contain information for resource allocation and decoding second stage control. The PSCCH 506 may be limited to a single sub-channel, and frequency domain and orthogonal cover code (FD-OCC) may be applied to demodulation reference signal (DMRS) to reduce an impact of colliding PSCCH 506 transmissions. Further, a transmitting UE may randomly select from a set of pre-defined FD-OCCs. Next, a second stage control (SCI-2) signal may be transmitted on the PSSCH 502 and may contain information for decoding data shared channel (SCH).

A receiving UE may decode the SCIs (e.g., SCI-1 and SCI-2) first, then decode the data. Next, the receiving UE may send a feedback hybrid automatic repeat request (HARQ) in the PSFCH 506 resource according to a cast type and a feedback mode.

In an aspect, enablement of full duplex communication on SL and UE to base station link (e.g., Uu interface) for a multi-TRP UE may be implemented. For example, a multi-TRP UE has the potential to transmit UL data and receive SL packets on the same frequency-time resource with different TRPs. In the second resource allocation mode, a first UE reserves a SL resource based on a reference signal received power (RSRP) measurement of TRP(s). Meanwhile, the multi-TRP UE may also figure out a feasible receiving beam with beam training process. Furthermore, for a multi-TRP UE with both Uu and SL (or PC5 interface) connectivity, UL transmission and SL reception may be enabled simultaneously, based on a self-interference measurement of a portion of TRPs of the multi-TRP UE.

In the present disclosure, a method of wireless communication is provided that allows a first UE to transmit UL data in a transmission control indicator (TCI), by measuring self-interference and reporting the feasible a receiving beam, and optionally reporting the interference level, to other SL UEs, to enable UL and SL single frequency full duplex communication, so that spectrum efficiency may be improved.

Figure 6:
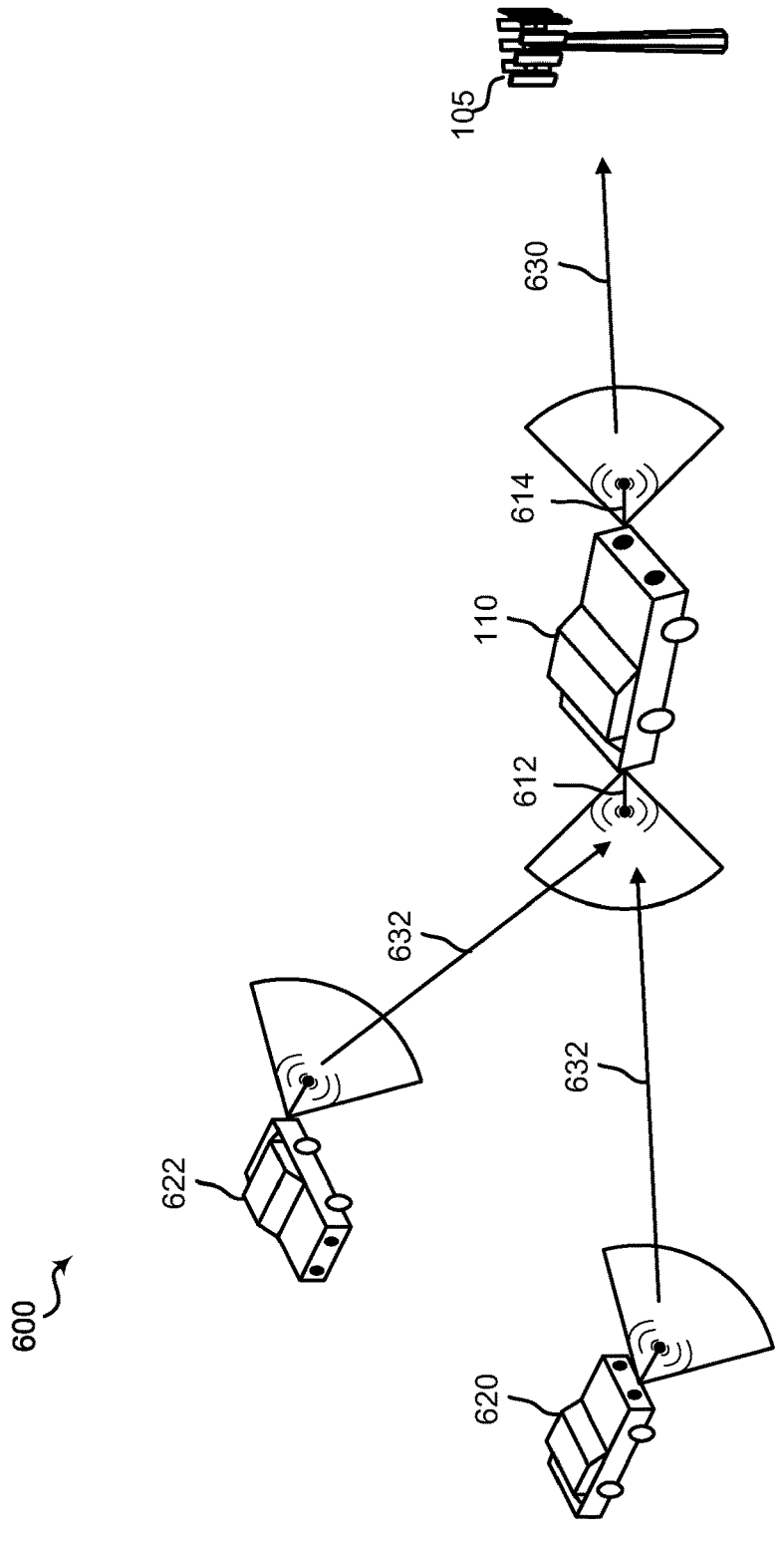
FIG. 6 is a conceptual diagram of an example of full duplex communication by UEs of FIG. 1 with multiple transmission and reception points (TRPs), according to aspects of the present disclosure.

Referring to FIG. 6, a UE 110 may include multi-TRPs positioned in different parts of the UE 110 to improve communication reliability by enabling SL and UL full duplex communication. The UE 110 may be an example of the V2X UE. In an example, a first TRP 612 may be positioned in a rear part of the UE 110, and a second TRP 614 may be positioned in a front part of the UE 110. However, the present disclosure is not limited to this example. Instead, aspects of the present disclosure may include any number of TRPs positioned on any part or location of the UE 110, where any of the multi-TRPs may perform UL communication or SL communication. For example, the first TRP 612 may include a plurality of TRPs configured for SL communication, and the second TRP 614 may include a plurality of TRPs configured for UL communication.

In the example illustrated by FIG. 6, the UE 110 may be configured to transmit and receive packets on the same time-frequency resource with different TRP(s) on UL (Uu interface) and SL (PC5 interface) links. For example, the UE 110 may be configured to conduct UL communication 630 with a base station 105 via the second TRP 614, and may be configured to receive SL communications 632 (e.g., SL packets) from a first SL UE 620 and/or a second SL UE 622 via the first TRP 612. The first SL UE 620 and the second SL UE 622 may be examples of the SL UE 110 of FIG. 1 performing SL communication with the UE 110.

In an aspect, the UE 110 may transmit UL data (e.g., UL communication 630) with a selected TCI state to the base station 105, based on beamforming measurement and refinement procedures. Based on a self-interference measurement, the UE 110 may determine one or more SL receiving beams that may be used for single frequency full duplex in a future resource from other TRP(s) (e.g., first SL UE 620 and second SL UE 622). The UE 110 may announce to SL UEs, including the first SL UE 620 and second SL UE 622, the availability of the one or more receiving SL beams (e.g., receiving configuration indicator (RCI)) and may optionally announce the interference level determined by the self-interference measurement, to enable potential full duplex communication.

The SL UEs (e.g., first SL UE 620 and second SL UE 622) that know the meaning of the RCI announced by the UE 110, due to previous beam training, may transmit a PSCCH or a PSSCH (e.g., SL communication 632) to the UE 110 in slots indicated by the RCI.

Figure 7:
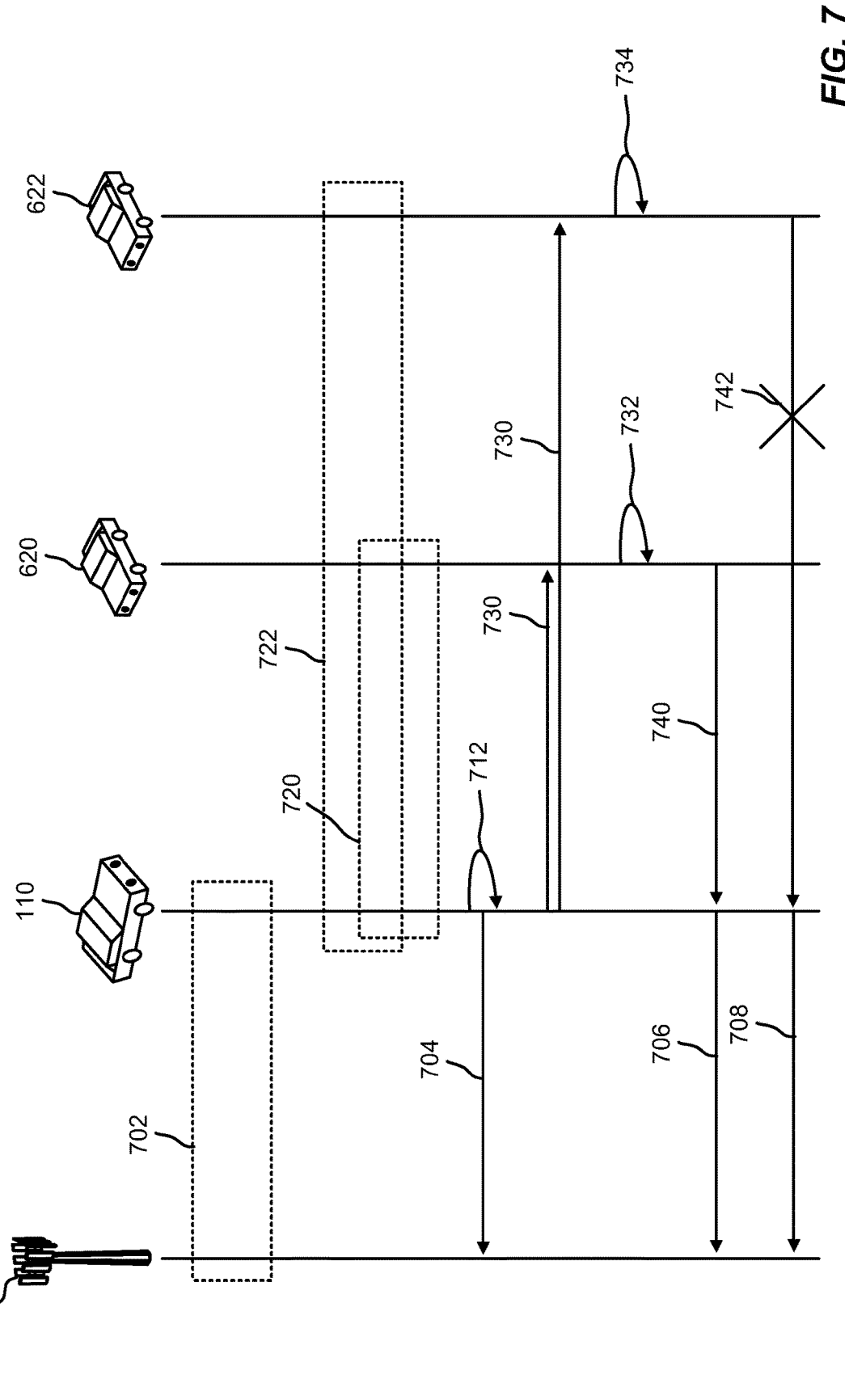
FIG. 7 is a call flow diagram of example communications, according to aspects of the present disclosure.

Referring to FIG. 7, the UE 110, which is a full duplex capable UE, may determine the RCI and available slots for SL reception. For example, based on a Uu beam management procedure 702 (e.g., beam management procedure between UE 110 and base station 105), the UE 110 may determine a transmission beam (e.g., TCI state) used for UL transmission. The UE 110 may conduct beam tracking and refinement procedures 720 and 722 with other SL UEs (e.g., SL UE 620 and SL UE 622) with, for example, radio resource control (RRC) connected unicast peers.

To enable full duplex communication, the second TRP 614 of the UE 110 may transmit an UL communication 704 (e.g., UL data) to the base station 105 using the determined TCI state while, at the same time, measuring self-interference 712 from the first TRP 612 (e.g., receiving TRPs). Self interference measurements may include, for example, SINR or RSRP levels at the receiving TRP(s) configured for receiving beam sets. If the SINR level or the RSRP level for one or more receiving beams is within a non-interference range (e.g., greater than a threshold), this may indicate that the UE 110 may enable the full duplex communication by transmitting UL data in the TCI state and receiving SL data with the selected one or more RCI states.

With the determined TCI state and RCI state, the UE 110 may transmit a message 730 to announce the RCI state to the first SL UE 620 and the second SL UE 622 (along with any other SL UE), so that the SL UEs, which have the beam pair knowledge with UE 110, may transmit SL data in the proposed future resource to the UE 110 based on beamforming correspondence information. In an example, the UE 110 may announce the message 730 in a unicast mode, a broadcast mode, or a groupcast mode, as part of SL control information (e.g., SCI-2 information). In another example, the message 730 may include an indication of one or more future time slots where the UE 110 is available to receive SL data, along with the indicated RCI state information. In another example, the message 730 may include an indication of self-interference levels measured by the UE 110, along with the indicated RCI state information. In yet another example, the message 730 may include an indication of a single frequency or sub-band full duplex with frequency separation requirements (e.g., number of resource blocks (RBs)), along with the indicated RCI state information.

Based on the RCI state information (and the optional additional information), SL transmissions from one or more the SL UEs may be conducted. For example, upon receiving the message 730, the first SL UE 620 may transmit a SL communication 740 (e.g., PSCCH or PSSCH) to the UE 110 in the SL slots indicated by the message 730, if the first SL UE 620 knows the meaning of the RCI state announced by the UE 110 due to the previous beam training 720. In an example, the first SL UE 620 may perform a feasibility procedure 732 to determine whether transmitting with the indicated beam (e.g., RCI state) is feasible. During the feasibility procedure 732, the first SL UE 620 may compare a threshold to either an interference level from a self interference measurement (e.g., SINR or RSRP measurement) performed by the first SL UE 620 or an interference level indicated by the message 730. If the interference level is within a certain range (e.g., greater than a threshold amount), the first SL UE 620 may determine that communication on the indicated beam is feasible. In response to the feasibility procedure 732, the first SL UE 620 may transmit the SL communication 740 (e.g., PSCCH or PSSCH) to the UE 110 in the SL slots/resources indicated by the message 730. Thus, in this example, the SL communication 740 would be received by the UE 110 on the first TRP 612 concurrently with the UE 110 transmitting a UL transmission 706 on the second TRP 614, allowing the UE 110 to perform SL and UL full duplex communication with multi-TRPs.

In another example, the second SL UE 622 may also receive the message 730 and perform a feasibility procedure 734, using the same operations as described for the feasibility procedure 732. In this example, the second SL UE 622 may determine the radio link between the first UE 110 and the second SL UE 622 is not feasible. For example, the second SL UE 622 may measure an interference level measured (e.g., SINR or RSRP level) and determine the interference level is less than a threshold or is less than the interference level indicated by the message 730. Based on the radio link not being feasible, the second SL UE 622 would not transmit the SL communication 742 in the SL slot/resource indicated by the message 730. Thus, in this example, the UE 110 would not perform SL and UL full duplex communication with multi-TRPs, while transmitting a UL transmission 708.

While the call flow diagram 700 describes an example of the operations for the UE 110 to perform SL and UL full duplex communication with multi-TRPs, the order of the operations is not limited to this described example and one or more of the operations may be performed in out of the described order.

Referring to FIG. 8, an example of a method 800 for SL and UL full duplex communication with multi-TRPs may be performed by the full duplex communication component 142, the modem 140, the transceiver 202, the processor 212, the memory 216, and or any other component/subcomponent of the UE 110 of the wireless communication network 100.

At block 802, the method 800 may optionally include determining a transmission beam of a second TRP for UL transmission based on a beam management procedure. For example, the full duplex communication component 142, the modem 140, the transceiver 202, the processor 212, and/or the memory 216 of the UE 110, and/or one or more additional components/subcomponents of the UE 110 may be configured to or may comprise means for determining a transmission beam of a second TRP for UL transmission based on a beam management procedure.

For example, the determining the transmission beam by the UE 110 at block 802 may include determining by the full duplex communication component 142, the modem 140, the processor 212, the transceiver 202, and/or the memory 216 of the UE 110, a transmission beam of the second TRP 614 for UL transmission based on a beam management procedure 702.

At block 804, the method 800 may optionally include performing one or more beam tracking procedures on one or more receiving beams of one or more first TRPs including the first TRP. For example, the full duplex communication component 142, the modem 140, the transceiver 202, the processor 212, and/or the memory 216 of the UE 110, and/or one or more additional components/subcomponents of the UE 110 may be configured to or may comprise means for performing one or more beam tracking procedures on one or more receiving beams of one or more first TRPs including the first TRP.

For example, the performing one or more beam tracking procedures by the UE 110 at block 804 may include performing by the full duplex communication component 142, the modem 140, the processor 212, the transceiver 202, and/or the memory 216 of the UE 110, one or more beam tracking procedures 720 and 722 on one or more receiving beams of one or more first TRPs including the first TRP 612.

At block 806, the method 800 may include determining full duplex communication including simultaneous reception of a SL communication from an SL UE via a first TRP of the UE and transmission of a UL transmission to a base station via a second TRP of the UE, is available. For example, the full duplex communication component 142, the modem 140, the transceiver 202, the processor 212, and/or the memory 216 of the UE 110, and/or one or more additional components/subcomponents of the UE 110 may be configured to or may comprise means for determining full duplex communication including simultaneous reception of a SL communication from an SL UE via a first TRP of the UE and transmission of a UL transmission to a base station via a second TRP of the UE, is available.

For example, the determining the full duplex communication is available at block 806 may include determining by the full duplex communication component 142, the modem 140, the processor 212, the transceiver 202, and/or the memory 216 of the UE 110 the full duplex communication including simultaneous reception of SL information from the first SL UE 620 or second SL UE 622 via the first TRP 612 and transmission of the UL information to the base station 105 via the second TRP 614, is available.

At block 808, the method 800 may optionally include performing a self-interference measurement of a receiving beam of the first TRP while simultaneously transmitting UL information to the base station via the second TRP. For example, the full duplex communication component 142, the modem 140, the transceiver 202, the processor 212, and/or the memory 216 of the UE 110, and/or one or more additional components/subcomponents of the UE 110 may be configured to or may comprise means for performing a self-interference measurement of a receiving beam of the first TRP while simultaneously transmitting UL information to the base station via the second TRP.

For example, the performing the self-interference measurement at block 808 may include performing by the full duplex communication component 142, the modem 140, the processor 212, the transceiver 202, and/or the memory 216 of the UE 110 performing the self-interference measurement of the receiving beam of the first TRP 612 while simultaneously transmitting UL information to the base station 105 via the second TRP 614.

At block 810, the method 800 may optionally include determining an interference level from the self-interference measurement is within an interference threshold range. For example, the full duplex communication component 142, the modem 140, the transceiver 202, the processor 212, and/or the memory 216 of the UE 110, and/or one or more additional components/subcomponents of the UE 110 may be configured to or may comprise means for determining an interference level from the self-interference measurement is within an interference threshold range.

For example, the determining the interference level is within an interference threshold range at block 810 may include determining by the full duplex communication component 142, the modem 140, the processor 212, the transceiver 202, and/or the memory 216 of the UE 110 an interference level (e.g., SINR level or RSRP level) from the self-interference measurement 712 is within an interference threshold range.

At block 812, the method 800 may include enabling the full duplex communication. For example, the full duplex communication component 142, the modem 140, the transceiver 202, the processor 212, and/or the memory 216 of the UE 110, and/or one or more additional components/subcomponents of the UE 110 may be configured to or may comprise means for enabling the full duplex communication.

For example, the enabling the full duplex communication at block 812 may include enabling by the full duplex communication component 142, the modem 140, the processor 212, the transceiver 202, and/or the memory 216 of the UE 110 the full duplex communication.

At block 814, the method 800 may optionally include transmitting, to the SL UE, a message including RCI state information indicating a slot or a resource for the SL UE to transmit the SL communication to the UE. For example, the full duplex communication component 142, the modem 140, the transceiver 202, the processor 212, and/or the memory 216 of the UE 110, and/or one or more additional components/subcomponents of the UE 110 may be configured to or may comprise means for transmitting, to the SL UE, a message including RCI state information indicating a slot or a resource for the SL UE to transmit the SL communication to the UE.

For example, the transmitting the message at block 814 may include transmitting by the full duplex communication component 142, the modem 140, the processor 212, the transceiver 202, and/or the memory 216 of the UE 110, to the first SL UE 620 (and/or the second SL UE 622), the message 730 including RCI state information indicating a slot or a resource for the SL UE (e.g., first SL UE 620 or second SL UE 622) to transmit the SL communication 740 to the UE 110.

At block 816, the method 800 may include receiving, from the SL UE in response to the enabling the full duplex communication, the SL communication via the first TRP. For example, the full duplex communication component 142, the modem 140, the transceiver 202, the processor 212, and/or the memory 216 of the UE 110, and/or one or more additional components/subcomponents of the UE 110 may be configured to or may comprise means for receiving, from the SL UE in response to the enabling the full duplex communication, the SL communication via the first TRP.

For example, the receiving the SL communication at block 816 may include receiving by the full duplex communication component 142, the modem 140, the processor 212, the transceiver 202, and/or the memory 216 of the UE 110 the SL communication 740 from the SL UE 620 via the first TRP 612.

At block 818, the method 800 may include transmitting, to the base station while simultaneously receiving the SL communication, the UL transmission via the second TRP. For example, the full duplex communication component 142, the modem 140, the transceiver 202, the processor 212, and/or the memory 216 of the UE 110, and/or one or more additional components/subcomponents of the UE 110 may be configured to or may comprise means for transmitting, to the base station while simultaneously receiving the SL communication, the UL transmission via the second TRP.

For example, the transmitting the UL transmission at block 818 may include transmitting by the full duplex communication component 142, the modem 140, the processor 212, the transceiver 202, and/or the memory 216 of the UE 110, to the base station 105 while simultaneously receiving the SL communication 740, the UL transmission 706 via the second TRP 614.

Referring to FIG. 9, an example of a method 900 for SL communication in a full duplex communication system may be performed by the SL-FD component 144, the modem 140, the transceiver 202, the processor 212, the memory 216, and or any other component/subcomponent of the UE 110 of the wireless communication network 100.

At block 902, the method 900 may include receiving, from a UE, a message indicating to transmit a SL communication to the UE and availability of full duplex communication including simultaneous reception of the SL communication by the UE from the SL UE via a first TRP of the UE and transmission of a UL transmission from the UE to a base station via a second TRP of the UE. For example, the SL-FD component 144, the modem 140, the transceiver 202, the processor 212, and/or the memory 216 of the SL UE 110, and/or one or more additional components/subcomponents of the SL UE 110 may be configured to or may comprise means for receiving a message.

For example, the receiving the message at the block 902 may include receiving by the SL-FD component 144, the modem 140, the transceiver 202, the processor 212, and/or the memory 216 of the SL UE 110, via the antenna 265, the RF front end 288, and/or the transceiver 202, from the UE 110, the message 730 indicating to transmit a SL communication to the UE 110 and availability of full duplex communication including simultaneous reception of the SL communication 740 by the UE 110 from the SL UE 110 via the first TRP 612 and transmission of the UL transmission 706 from the UE 110 to the base station 105 via the second TRP 614.

At block 904, the method 900 may include determining whether to transmit the SL communication to the UE in response to the receiving the message. For example, the SL-FD component 144, the modem 140, the transceiver 202, the processor 212, and/or the memory 216 of the SL UE 110, and/or one or more additional components/subcomponents of the SL UE 110 may be configured to or may comprise means for determining whether to transmit the SL communication to the UE in response to the receiving the message.

For example, the determining whether to transmit the SL communication at the block 904 may include determining by the SL-FD component 144, the modem 140, the transceiver 202, the processor 212, and/or the memory 216 of the SL UE 110, determining whether to transmit the SL communication 740 to the UE 110 in response to the receiving the message 730.

At block 906, the method 900 may include transmitting, to the UE, the SL communication in response to the determining. For example, the SL-FD component 144, the modem 140, the transceiver 202, the processor 212, and/or the memory 216 of the SL UE 110, and/or one or more additional components/subcomponents of the SL UE 110 may be configured to or may comprise means for transmitting, to the UE, the SL communication in response to the determining.

For example, the transmitting the SL communication at the block 906 may include transmitting by the SL-FD component 144, the modem 140, the transceiver 202, the processor 212, and/or the memory 216 of the SL UE 110, via the antenna 265, the RF front end 288, and/or the transceiver 202, to the UE 110, the SL communication 740 in response to the determining.

Additional Implementations

An example method of wireless communication by a UE, comprising: determining full duplex communication including simultaneous reception of an SL communication from an SL UE via a first TRP of the UE and transmission of a UL transmission to a base station via a second TRP of the UE, is available; enabling, in response to the determining the full duplex communication is available, the full duplex communication; receiving, from the SL UE in response to the enabling the full duplex communication, the SL communication via the first TRP; and transmitting, to the base station while simultaneously receiving the SL communication, the UL transmission via the second TRP.

The above example method, wherein the determining the full duplex communication is available comprises: performing a self-interference measurement of a receiving beam of the first TRP while simultaneously transmitting UL information to the base station via the second TRP; and determining an interference level from the self-interference measurement is within an interference threshold range.

One or more of the above example methods, further comprising: determining a transmission beam of the second TRP for the UL transmission based on a beam management procedure, wherein the performing the self-interference measurement is in response to the determining the transmission beam.

One or more of the above example methods, further comprising: performing one or more beam tracking procedures on one or more receiving beams of one or more first TRPs including the first TRP, wherein the performing the self-interference measurement is in response to the performing the one or more beam tracking procedures.

One or more of the above example methods, wherein interference level is based on one or more of an SINR level or an RSRP level of the receiving beam of the first TRP.

One or more of the above example methods, wherein enabling the full duplex communication comprises: transmitting, to the SL UE, a message including RCI state information indicating a slot or a resource for the SL UE to transmit the SL communication to the UE.

One or more of the above example methods, wherein the message is transmitted in a unicast mode, a broadcast mode, or a groupcast mode.

One or more of the above example methods, wherein the message is transmitted as a part of SL control information.

One or more of the above example methods, wherein the message further indicates information from a self-interference measurement by the UE.

One or more of the above example methods, wherein the message further indicates one or more of a single frequency requirement or a sub-band full duplex with frequency separation requirement. 1001171A second method of wireless communication by an SL UE, comprising: receiving, from a UE, a message indicating to transmit a SL communication to the UE and availability of full duplex communication including simultaneous reception of the SL communication by the UE from the SL UE via a first TRP of the UE and transmission of a UL transmission from the UE to a base station via a second TRP of the UE; determining whether to transmit the SL communication to the UE in response to the receiving the message; and transmitting, to the UE, the SL communication in response to the determining.

The above second example method, wherein the message includes RCI state information indicating a slot or a resource for the SL UE to transmit the SL communication to the UE.

One or more of the above second example methods, wherein the message is transmitted in a unicast mode, a broadcast mode, or a groupcast mode.

One or more of the above second example methods, wherein the message is transmitted as a part of SL control information.

One or more of the above second example methods, wherein the message further indicates one or more of a single frequency requirement or a sub-band full duplex with frequency separation requirement.

One or more of the above second example methods, wherein the determining whether to transmit the SL communication to the UE comprises: comparing an interference measurement level of a SL beam between the SL UE and the UE to an interference threshold amount; and transmitting the SL communication in response to the interference measurement level being within an interference threshold range.

One or more of the above second example methods, further comprising:
  performing an interference measurement on the SL beam to obtain the interference measurement level.

One or more of the above second example methods, wherein the message further indicates the interference measurement level.

An example UE, comprising: a memory storing instructions; and one or more processors communicatively coupled with the memory and configured to: determine full duplex communication including simultaneous reception of an SL communication from an SL UE via a first TRP of the UE and transmission of a UL transmission to a base station via a second TRP of the UE, is available; enable, in response to determining the full duplex communication is available, the full duplex communication; receive, from the SL UE in response to enabling the full duplex communication, the SL communication via the first TRP; and transmit, to the base station while simultaneously receiving the SL communication, the UL transmission via the second TRP.

The above example UE, wherein the one or more processors is further configured to: perform a self-interference measurement of a receiving beam of the first TRP while simultaneously transmitting UL information to the base station via the second TRP; and determine an interference level from the self-interference measurement is within an interference threshold range, wherein determining the full duplex communication is available is in response to determining the interference level.

One or more of the above example UEs, wherein the one or more processors is further configured to: determine a transmission beam of the second TRP for the UL transmission based on a beam management procedure, wherein performing the self-interference measurement is in response to determining the transmission beam.

One or more of the above example UEs, wherein the one or more processors is further configured to: perform one or more beam tracking procedures on one or more receiving beams of one or more first TRPs including the first TRP, wherein performing the self-interference measurement is in response to performing the one or more beam tracking procedures.

One or more of the above example UEs, wherein the interference level is based on one or more of an SINR level or an RSRP level of the receiving beam of the first TRP.

One or more of the above example UEs, wherein the one or more processors is further configured to: transmit, to the SL UE, a message including RCI state information indicating a slot or a resource for the SL UE to transmit the SL communication to the UE.

An example SL UE, comprising: a memory storing instructions; and one or more processors communicatively coupled with the memory and configured to: receive, from a UE, a message indicating to transmit a SL communication to the UE and availability of full duplex communication including simultaneous reception of the SL communication by the UE from the SL UE via a first TRP of the UE and transmission of a UL transmission from the UE to a base station via a second TRP of the UE; determine whether to transmit the SL communication to the UE in response to receiving the message; and transmit, to the UE, the SL communication in response to determining whether to transmit the SL communication.

The example SL UE, wherein the message includes RCI state information indicating a slot or a resource for the SL UE to transmit the SL communication to the UE.

One or more of the above example SL UEs, wherein the message is transmitted in a unicast mode, a broadcast mode, or a groupcast mode.

One or more of the above example SL UEs, wherein the message is transmitted as a part of SL control information.

One or more of the above example SL UEs, wherein the message further indicates one or more of a single frequency requirement or a sub-band full duplex with frequency separation requirement.

One or more of the above example SL UEs, wherein the one or more processors is further configured to: compare an interference measurement level of a SL beam between the SL UE and the UE to an interference threshold amount; and transmit the SL communication in response to the interference measurement level being within an interference threshold range.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description herein, however, describes an LTE/LTE-A system or 5G system for purposes of example, and LTE terminology is used in much of the description below, although the techniques may be applicable other next generation communication systems.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of wireless communication by a user equipment (UE), comprising:

determining full duplex communication including simultaneous reception of a sidelink (SL) communication from an SL UE via a first transmission and reception point (TRP) of the UE and transmission of an uplink (UL) transmission to a base station via a second TRP of the UE, is available;

enabling, in response to the determining the full duplex communication is available, the full duplex communication;

receiving, from the SL UE in response to the enabling the full duplex communication, the SL communication via the first TRP; and transmitting, to the base station while simultaneously receiving the SL communication, the UL transmission via the second TRP.

2. The method of claim 1, wherein the determining the full duplex communication is available comprises:

performing a self-interference measurement of a receiving beam of the first TRP while simultaneously transmitting UL information to the base station via the second TRP; and determining an interference level from the self-interference measurement is within an interference threshold range.

3. The method of claim 2, further comprising:

determining a transmission beam of the second TRP for the UL transmission based on a beam management procedure, wherein the performing the self-interference measurement is in response to the determining the transmission beam.

4. The method of claim 2, further comprising:

performing one or more beam tracking procedures on one or more receiving beams of one or more first TRPs including the first TRP, wherein the performing the self-interference measurement is in response to the performing the one or more beam tracking procedures.

5. The method of claim 2, wherein the interference level is based on one or more of a signal-to-noise and interference ratio (SINR) level or a reference signal received power (RSRP) level of the receiving beam of the first TRP.

6. The method of claim 1, wherein enabling the full duplex communication comprises:

transmitting, to the SL UE, a message including receiving configuration information (RCI) state information indicating a slot or a resource for the SL UE to transmit the SL communication to the UE.

7. The method of claim 6, wherein the message is transmitted in a unicast mode, a broadcast mode, or a groupcast mode.

8. The method of claim 6, wherein the message is transmitted as a part of SL control information.

9. The method of claim 6, wherein the message further indicates information from a self-interference measurement by the UE.

10. The method of claim 6, wherein the message further indicates one or more of a single frequency requirement or a sub-band full duplex with frequency separation requirement.

11. A method of wireless communication by a sidelink (SL) user equipment (UE), comprising:

receiving, from a UE, a message indicating to transmit a SL communication to the UE and availability of full duplex communication including simultaneous reception of the SL communication by the UE from the SL UE via a first transmission and reception point (TRP) of the UE and transmission of an uplink (UL) transmission from the UE to a base station via a second TRP of the UE;

determining whether to transmit the SL communication to the UE in response to the receiving the message; and transmitting, to the UE, the SL communication in response to the determining.

12. The method of claim 11, wherein the message includes receiving configuration information (RCI) state information indicating a slot or a resource for the SL UE to transmit the SL communication to the UE.

13. The method of claim 11, wherein the message is transmitted in a unicast mode, a broadcast mode, or a groupcast mode.

14. The method of claim 11, wherein the message is transmitted as a part of SL control information.

15. The method of claim 11, wherein the message further indicates one or more of a single frequency requirement or a sub-band full duplex with frequency separation requirement.

16. The method of claim 11, wherein the determining whether to transmit the SL communication to the UE comprises:

comparing an interference measurement level of a SL beam between the SL UE and the UE to an interference threshold amount; and transmitting the SL communication in response to the interference measurement level being within an interference threshold range.

17. The method of claim 16, further comprising:

performing an interference measurement on the SL beam to obtain the interference measurement level.

18. The method of claim 16, wherein the message further indicates the interference measurement level.

19. A user equipment (UE), comprising:

a memory storing instructions; and one or more processors communicatively coupled with the memory and configured to:

determine full duplex communication including simultaneous reception of a sidelink (SL) communication from an SL UE via a first transmission and reception point (TRP) of the UE and transmission of an uplink (UL) transmission to a base station via a second TRP of the UE, is available;

enable, in response to determining the full duplex communication is available, the full duplex communication;

receive, from the SL UE in response to enabling the full duplex communication, the SL communication via the first TRP; and transmit, to the base station while simultaneously receiving the SL communication, the UL transmission via the second TRP.

20. The UE of claim 19, wherein the one or more processors is further configured to:

perform a self-interference measurement of a receiving beam of the first TRP while simultaneously transmitting UL information to the base station via the second TRP; and determine an interference level from the self-interference measurement is within an interference threshold range, wherein determining the full duplex communication is available is in response to determining the interference level.

21. The UE of claim 20, wherein the one or more processors is further configured to:

determine a transmission beam of the second TRP for the UL transmission based on a beam management procedure, wherein performing the self-interference measurement is in response to determining the transmission beam.

22. The UE of claim 20, wherein the one or more processors is further configured to:

perform one or more beam tracking procedures on one or more receiving beams of one or more first TRPs including the first TRP, wherein performing the self-interference measurement is in response to performing the one or more beam tracking procedures.

23. The UE of claim 20, wherein the interference level is based on one or more of a signal-to-noise and interference ratio (SINR) level or a reference signal received power (RSRP) level of the receiving beam of the first TRP.

24. The UE of claim 20, wherein the one or more processors is further configured to:

transmit, to the SL UE, a message including receiving configuration information (RCI) state information indicating a slot or a resource for the SL UE to transmit the SL communication to the UE.

25. A sidelink (SL) user equipment (UE), comprising:

a memory storing instructions; and one or more processors communicatively coupled with the memory and configured to:

receive, from a UE, a message indicating to transmit a SL communication to the UE and availability of full duplex communication including simultaneous reception of the SL communication by the UE from the SL UE via a first transmission and reception point (TRP) of the UE and transmission of a uplink (UL) transmission from the UE to a base station via a second TRP of the UE;

determine whether to transmit the SL communication to the UE in response to receiving the message; and transmit, to the UE, the SL communication in response to determining whether to transmit the SL communication.

26. The SL UE of claim 25, wherein the message includes receiving configuration information (RCI) state information indicating a slot or a resource for the SL UE to transmit the SL communication to the UE.

27. The SL UE of claim 25, wherein the message is transmitted in a unicast mode, a broadcast mode, or a groupcast mode.

28. The SL UE of claim 25, wherein the message is transmitted as a part of SL control information.

29. The SL UE of claim 25, wherein the message further indicates one or more of a single frequency requirement or a sub-band full duplex with frequency separation requirement.

30. The SL UE of claim 25, wherein the one or more processors is further configured to:

compare an interference measurement level of a SL beam between the SL UE and the UE to an interference threshold amount; and transmit the SL communication in response to the interference measurement level being within an interference threshold range.

* * * * *